March 28, 1944.  C. E. BANNISTER  2,345,024
PERCUSSION TYPE MOTOR ASSEMBLY
Filed July 23, 1941
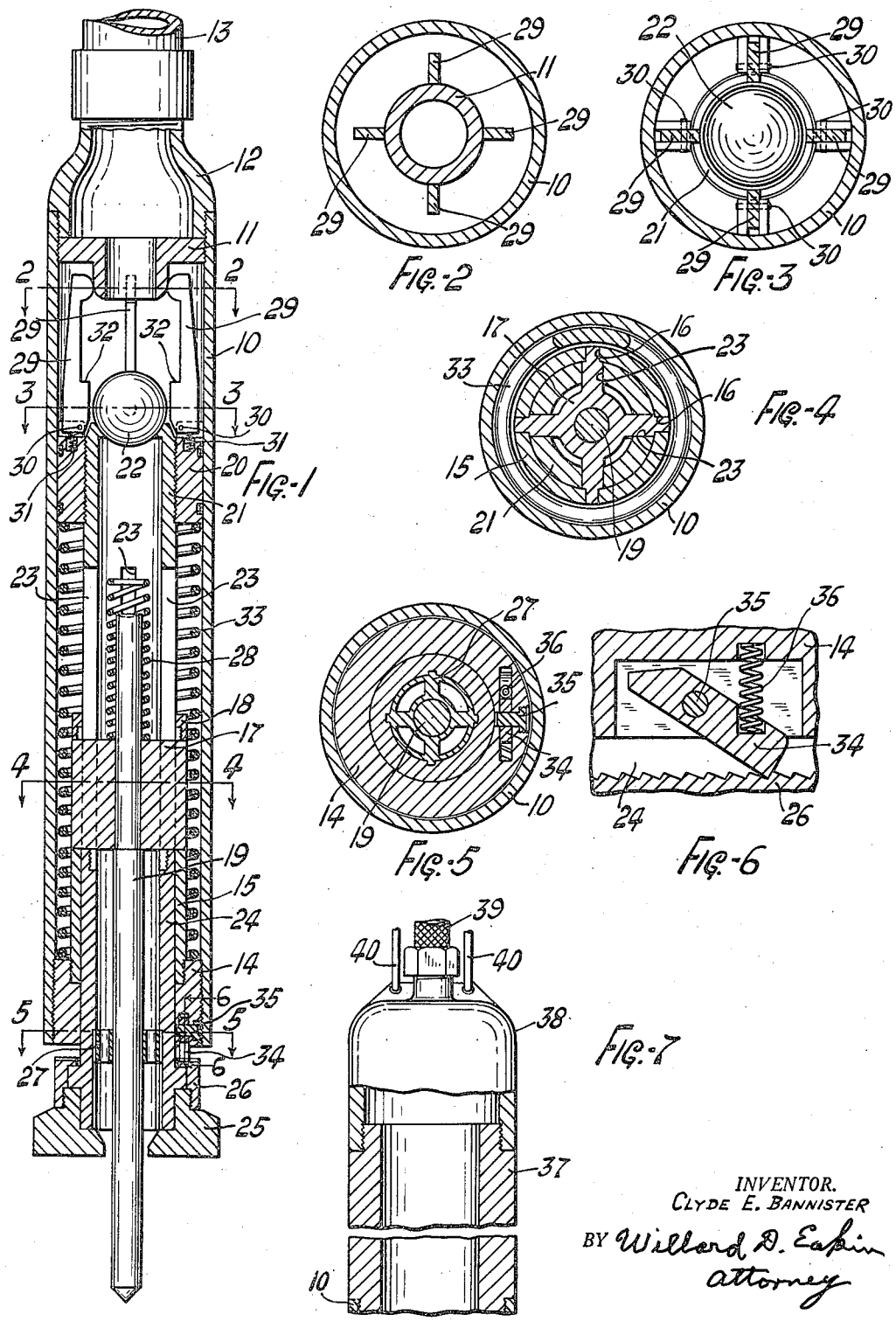
INVENTOR.
CLYDE E. BANNISTER
BY Willard D. Eakin
attorney Patented Mar. 28, 1944

2,345,024

UNITED STATES PATENT OFFICE 2,345,024

PERCUSSION TYPE MOTOR ASSEMBLY

Clyde E. Bannister, Tulsa, Okla.

Application July 23, 1941, Serial No. 403,657

6 Claims. (Cl. 255—4)

This invention relates to percussion-type motors and to the combination of such a motor with a drilling bit and other equipment suitable for use in earth-boring operations such as the drilling of oil wells.

Its chief objects are to provide simplicity, economy and efficiency in such apparatus, and, more specifically, to provide facility of assembly and disassembly, as for repair or replacement of parts.

Of the accompanying drawing:

Fig. 1 is a vertical, axial section of apparatus embodying my invention and held in a vertical position, as in being suspended in a well.

Fig. 2 is a section on line 2—2 of Fig. 1.
Fig. 3 is a section on line 3—3 of Fig. 1.
Fig. 4 is a section on line 4—4 of Fig. 1.
Fig. 5 is a section on line 5—5 of Fig. 1.
Fig. 6 is a section on line 6—6 of Fig. 1.

Fig. 7 is a fragmentary elevation, with parts sectioned and broken away, illustrating a modification.

Referring to the drawing, the embodiment here shown comprises a cylindrical motor shell or casing 10 having threaded into its upper end a cam ring 11 and an end-closure and coupling member 12 which is coupled to a pipe 13, which latter may be drill pipe such as is used in rotary drilling.

Threaded into the lower end of the motor casing 10 is an annular end plug 14 having threaded into its upper end, and spaced from the motor casing, a spider-supporting sleeve 15. The latter is formed with slots 16, 16, Fig. 4, extending from its upper end, for receiving and seating respective shouldered arms of a motor-supporting spider 17. The sleeve 15 has a retaining cap 18 screwed onto its upper end for holding the spider 17 seated in the slots.

A supporting pin 19, pointed at its lower end for non-slip engagement with the floor of the well hole, is formed with an annular shoulder at the lower end of a relatively small-diameter upper end portion of the pin which extends upward through a central aperture in the spider 17. The latter seats upon the said shoulder, this arrangement being such that, when not otherwise supported, the motor casing and parts rigid with it are supported, from the floor of the hole, by the pin 19.

Slidably and rotatably mounted in the motor casing 10, which serves as a cylinder, is an annular piston 20 having threaded through it a hollow piston stem 21. The latter is formed at its upper end with a valve seat for a ball valve 22 and which also is formed with guide slots 23, 23 which extend from its lower end for accommodating the arms of the spider 17 and permitting the piston stem to slide up and down with relation to the spider.

Threaded onto the lower end of the piston stem 21, as an extension thereof, is a bit stem 24 which has a drill bit 25 swiveled on its lower end by means of a flanged swivel collar 26.

The jointed piston-stem and bit-stem, 21 and 24, slidably fit within the motor supporting sleeve 15. To provided guiding relation between the bit stem 24 and the motor supporting pin 19 at a low position, spaced from the pin-engaged spider 17, a spider 27, Figs. 1 and 5, is mounted with a pressed fit in complementary grooves formed in, and extending from the lower end of, the inner face of the bit stem.

Loosely surrounding the projecting upper end portion of the supporting pin 19 and extending some distance above it, and seated upon the upper face of the motor-supporting spider 17, is a helical compression spring 28. This spring is adapted to be compressed by the ball valve 22 in the last part of the descent of the piston assembly and then, by its recoil, to lift the ball a substantial distance from its seat when the ball has been unseated by its contact with the upper end of the pin 19.

For holding the ball valve 22 in its resulting elevated position with relation to its seat during the upward return stroke of the piston a circumferential series of pivoted cam-follower arms 29, 29 are pivoted on the piston 20 as at 30, 30. Each of these cam-follower arms 30 is backed by a helical compression spring 31 seated on the piston, and each of them is formed with a shoulder portion 32 adapted to take under the ball when it has been lifted by the spring 28. The upper ends of the arms are adapted to be swung outward, against the force of the springs 31, by their contact with the cam ring 11, to release the ball and allow it to re-seat itself, as the piston reaches the end of the upward movement. That movement is effected by the recoil of a large helical compression spring 33, interposed between the end plug 14 and the piston 20.

The construction thus far described is such that as fluid under pressure is supplied to the motor through the pipe 13 with the motor supported on the pin 19, the fluid forces the piston-and-bit assembly downward until the bit 25 strikes the bottom of the drill hole and permissibly causes the pin 19 to be lifted slightly from its position against the floor of the hole. The proportions of the parts preferably are such that at the end of the down stroke of the bit its cutting bottom edges will be about half an inch lower than the lower end of the pin 19, in the case of an assembly of the proportions shown and having an over-all casing diameter of four inches. The proportions preferably are such also, that the upper end of the pin 19 will contact the ball valve 22 at or about the time that the lower face of the bit is at the same elevation as, or slightly below, the lower end of the pin 19.

As soon as the pin 19 has unseated the ball valve 27, the flow of fluid through the valve seat, and through the spiders to the bit, begins an equalization of pressures above and below the ball. It is further elevated by recoil of the spring 28 and then held elevated by the shoulders 32 of the arms 29. The equalization of pressures permits the large spring 33 to raise the piston-and-bit assembly until the motor is again supported by the pin 19 and with the bit and the piston in their highest positions.

As the piston reaches its highest position the arms 29 contact, and are swung outward by, the annular cam portion of the ring 11, which permits the ball 22 to return to its seat. The cycle of operation thus is automatically caused to be repeated, with an efficient chopping of the bottom of the hole by the bit and with washing away of the cuttings by the spent motive fluid flowing upward about the motor and the pipe 13 and to the top of the hole.

To provide for stepping the swiveled bit circumferentially of the assembly in each cycle of operation, so that it will hit different parts of the floor of the hole in each successive cycle, the upper face of the swivel collar 26 is formed as a ratchet which coacts with a pawl 34 pivoted at 35 in the end plug 14 and backed by a spring 36, Fig. 6. Thus the action of the pawl 34 is that of a moving-strut, as distinguished from that of a pawl which moves its load by its own movement of translation and not by turning movement on its pivot after it has engaged its load, as in the present case.

In the modification shown in Fig. 7, the motor casing 10, with the parts carried by it, can be the same as in Fig. 1. Here, however, it has threaded into its upper end a heavy, hollow, inertia member 37, and upon the upper end of that is threaded an end-closure and coupling member 38 which is coupled to a hose 39 through which the motive fluid is supplied. The heavy inertia member 37 is adapted to sustain the reaction of the motor in the downward stroke of the bit and thus provide strong impact of the bit.

Support for the lowering of the motor assembly into and withdrawing it from the hole, and permissibly for sustaining part of the weight of the assembly during the drilling, can be provided by the hose 39 alone or by cables 40, 40.

The invention as described provides the advantages that are set out in the above statement of objects and further modifications are possible within the scope of the appended claims.

A further advantage of the assembly illustrated in Fig. 7 is that, the hose having substantial elasticity under the expanding force of the pressure fluid, harmful water-hammer effects are avoided.

I claim:

1. Earth-boring apparatus for drilling a downwardly-progressing hole and comprising a pressure-fluid cylinder, a reciprocating piston therein, a percussion-type bit connected to the piston for reciprocation therewith, means for conducting pressure-fluid to the cylinder to actuate the piston therein, and means adapted to engage the bottom of the hole for at least partially supporting the cylinder when the bit is in its return stroke.

2. Earth-boring apparatus for drilling a downwardly-progressing hole and comprising a pressure-fluid cylinder, a piston therein, means for conducting pressure-fluid to the cylinder to effect relative reciprocation of the cylinder and piston, a percussion-type bit connected with one of the latter for actuation thereby, and means engaging the bottom of the hole for supporting the other of the two in the return stroke of the bit.

3. Earth-boring apparatus comprising a pressure-fluid cylinder, a piston therein, means for conducting pressure-fluid to the cylinder to effect relative reciprocation of the cylinder and piston, a hollow shaft secured to the piston, a spring urging the piston in a direction opposite to the pressure of the fluid but adapted to be overcome by the latter, a valve controlling flow of fluid from the fluid-pressure side of the piston into the hollow shaft, means for opening said valve at the end of the pressure-fluid stroke, latching means for holding the valve open during the spring-actuated stroke, and means for effecting the closing of said valve at the end of the last-mentioned stroke.

4. Earth-boring apparatus comprising a pressure-fluid cylinder, a piston therein, means for conducting pressure-fluid to the cylinder to effect relative reciprocation of the cylinder and piston, a hollow shaft secured to the piston, a spring urging the piston in a direction opposite to the pressure of the fluid but adapted to be overcome by the latter, a valve controlling flow of fluid from the fluid-pressure side of the piston into the hollow shaft, means for opening said valve at the end of the pressure-fluid stroke, latching means for holding the valve open during the spring-actuated stroke, and cam means for disengaging said latching means at the end of the last-mentioned stroke.

5. Earth-boring apparatus comprising a pressure-fluid cylinder, a piston therein, means for conducting pressure-fluid to the cylinder to effect relative reciprocation of the cylinder and piston, a spring urging the piston in one direction but adapted to be overcome by the fluid-pressure, a hollow shaft secured to the piston and communicating, through the piston, with the pressure-fluid side of the latter, a valve controlling flow of fluid from the pressure-fluid side of the piston into said hollow shaft, yielding means interposed operatively between the cylinder and the valve and adapted to be stressed in the pressure-fluid stroke and consequently to urge the valve toward open position at the end of said stroke, latching means mounted on the piston for holding the valve open during the spring-actuated stroke, and cam means on the cylinder for disengaging the latching means at the end of the last-mentioned stroke.

6. Earth-boring apparatus comprising a pressure-fluid cylinder, a piston therein, means for conducting pressure-fluid to the cylinder to effect relative reciprocation of the cylinder and piston, a spring urging the piston in one direction but adapted to be overcome by the fluid-pressure, a hollow shaft secured to the piston and communicating, through the piston, with the pressure-fluid side of the latter, a valve controlling flow of fluid from the pressure-fluid side of the piston into said hollow shaft, yielding means interposed operatively between the cylinder and the valve and adapted to be stressed in the pressure-fluid stroke but only near the end thereof and consequently to urge the valve toward open position at the end of said stroke, latching means mounted on the piston for holding the valve open during the spring-actuated stroke, and cam means on the cylinder for disengaging the latching means at the end of the last mentioned stroke.

CLYDE E. BANNISTER.

Disclaimer 2,345,024.—*Clyde E. Bannister*, Tulsa, Okla. PERCUSSION TYPE MOTOR ASSEMBLY.
Patent dated Mar. 28, 1944. Disclaimer filed Oct. 6, 1949, by the inventor.

Hereby enters this disclaimer from the scope of claims 1 and 2 only of said Letters Patent, all percussion type motor assemblies except those in which the means adapted to engage or engaging the bottom of the hole as recited is connected to the one of the two relatively reciprocating elements which does not have the specified bit connected to it, with that element having the greater force of gravity urging it toward the bottom of the hole, and with the specified bit, connected to the other of the relatively reciprocating elements, adapted to do substantially all of the cutting, so that the said means can be the primary factor for controlling the bit's range of movement in relation to the bottom of the hole.

[*Official Gazette November 8, 1949.*]